United States Patent [19]

Ball et al.

[11] 3,949,636

[45] Apr. 13, 1976

[54] SAW GUARD

[75] Inventors: Kirby L. Ball, Thomasville; J. Clyde Darr, Lexington; Theodore F. Harrison, Jr., Thomasville, all of N.C.

[73] Assignee: Armstrong Cork Company, Lancaster, Pa.

[22] Filed: Feb. 21, 1975

[21] Appl. No.: 551,616

[52] U.S. Cl. .................................................. 83/478

[51] Int. Cl.² .................... B27G 19/02; B23D 59/00

[58] Field of Search .............. 83/478, 397, 544–546; 144/251 R, 251 A, 251 B

[56] References Cited

UNITED STATES PATENTS

| | | | |
|---|---|---|---|
| 882,122 | 3/1908 | Porter | 144/251 B |
| 1,630,671 | 5/1927 | Retz | 144/251 B |
| 1,662,372 | 3/1928 | Ward | 83/478 |
| 2,731,049 | 1/1956 | Akin | 83/478 X |
| 3,808,932 | 5/1974 | Russell | 83/478 |

*Primary Examiner*—J. M. Meister

[57] ABSTRACT

The saw guard covers the blade during non-sawing periods and moves freely out of the way when sawing is being carried out. The saw guard is so constructed that the saw blade is visible at all times.

3 Claims, 1 Drawing Figure

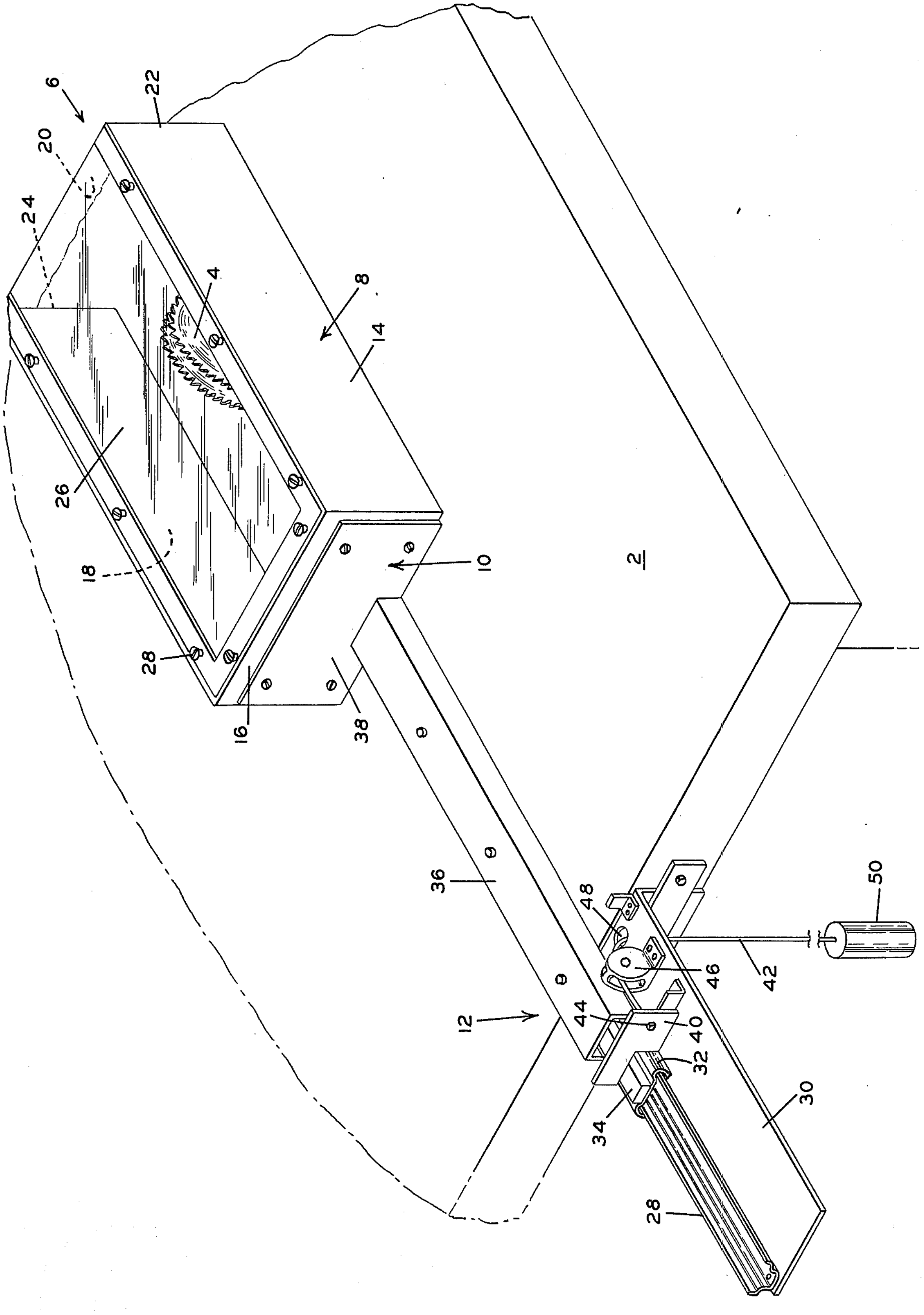
6
22
20
24
4
8
14
26
18
10
2
28
16
38
36
12
48
46
44
40
42
50
32
30
34
28

SAW GUARD

BACKGROUND OF THE INVENTION

1. Field of the Invention

The invention is directed to a saw guard and, more specifically, to a saw guard assembly for rotary table saws.

2. Description of the Prior Art

U.S. Pat. No. 1,630,671 is directed to a guard for a planing machine and discloses a guard structure that is provided with a counterbalance structure to assist in the movement of the guard structure.

U.S. Pat. No. 1,662,372 is directed to a saw guard structure wherein a hood covers the saw blade of a rotary table saw and may be pushed out of the way by the material to be cut so that the saw blade is exposed to cut the material in question.

U.S. Pat. No. 2,731,049 is directed to a saw guard structure for a rotary table saw wherein the guard structure is transparent to permit one to view the saw blade when it is protected by the guard structure.

SUMMARY OF THE INVENTION

The invention is directed to a saw guard which is very light and of simple construction. The guard for the saw blade slides back out of the way from the blade as material is fed into the saw blade. The guard is returned to its protective position by the pull of a cable and counterweight. The guard is allowed to move freely through the use of a guide structure which is mounted on a stationary mounting. The cover portion of the guard is of light weight and has at least a Plexiglas top so that the blade is visible at all times. The guard will permit the use of various width and depth of saw cuts. The guard may be readily attached to any conventional rotary table saw and is usable with probably 90% of the different operations which may be performed on a rotary table saw.

BRIEF DESCRIPTION OF THE DRAWING

The DRAWING is a perspective view of the saw guard invention herein.

DESCRIPTION OF THE PREFERRED EMBODIMENT

The saw guard invention herein is shown schematically in the drawing. The guard assembly is adapted to be mounted to the table 2 of a conventional rotary table saw. Protruding from the table 2 is the saw blade 4 which will be utilized to cut material. Normally the material will be fed in the direction 6 into the saw blade 4. The guard assembly 8 is composed primarily of the guard subassembly 10 and the movement control subassembly 12.

The guard subassembly 10 is basically a box structure that overlies the saw blade 4. The box structure has three sides 14, 16 and 18, positioned to both sides and the back of the saw blade. The front side 20 of the guard subassembly 10 is open and it is towards this side 20 that material is pushed to be cut. As the material to be cut pushes upon the edge 22 of side 8 and edge 24 of side 18, the guard subassembly 10 will move in the direction of the arrow 6 exposing the saw blade 4 and permitting the material to be cut to engage the saw blade 4. On the top of the guard subassembly 10 there is positioned a Plexiglas cover 26. This overlies the saw

4 and is connected to the top side of the sides 14, 16 and 18. It may be connected to the sides by any conventional means, for example, the screws 28 shown in the drawing. The Plexiglas cover then permits one to see the saw blade so that it is now possible to properly guide the material to be cut towards the saw blade.

The second part of the guard assembly 8 is the movement control subassembly 12. Ths is composed of a lower slide 28 which is mounted on a support means 30 fastened to the edge of the saw table 2. The lower slide 28 is engaged by an upper slide 32. These two slides may be separated by small ball bearings or they could actually contact each other with a lubricating surface therebetween so that they will slide relative to each other. In actual practice, the lower slide 28 and the upper slide 32 and nothing more than a conventional drawer slide assembly which is used in conventional furniture. Upper slide 32 has a bar 34 extending longitudinally down the center of the slide and this in turn is connected to a U-shaped channel member 36. The U-shaped channel member 36 is then fastened to a backing plate 38 which is fastened by conventional means to the back side 16 of the saw guard subassembly 10. When the saw guard is moved in the direction of arrow 6, the U-shaped support 36 moves backwards and in turn causes upper slide 32 to move along lower slide 28. This provides a freely moving guide structure to guide the saw guard subassembly 10 so that it moves in the direction 6 away from the saw blade 4. It also provides a structure which will accurately guide the saw guide subassembly 10 back into position to cover the saw blade 4. A plate 40 is fastened to bar 34 so that it will move along with bar 34 and upper slide 32. A cable 42 has its one end 44 fastened to the bar 40. The cable passes around a pulley assembly 46 and then through a hole 48 in support 30. On the opposite end of the cable 42, there is positioned a counterweight 50. The counterweight 50 is so sized as to approximately balance the mass of the saw guard subassembly 10 and the parts of the movement control subassembly 12 connected thereto. Actually, the mass of 50 slightly exceeds the above mass so that the saw guard subassembly 10 is held in position over the saw and a slight pressure will be required to move the saw guard subassembly 10 from its position over top of the saw 4. When this slight pressure is removed, then the mass of the counterweight will be sufficient to return the saw guard subassembly 10 automatically to its protective position over the saw.

As described above, there is now provided a structure which may guard the saw of a conventional table saw and the guard assembly may be moved from its saw guarding position, with just a slight pressure thereon, to a non-guarding position to expose the saw blade for use against a piece of material to be cut. Once the slight pressure is removed from the saw guard assembly, it will quickly return to its guarding position overlying the saw 4.

What is claimed is:

1. A saw guard assembly for use in combination with a conventional rotary saw table wherein said saw guard assembly comprises:

a. a saw guard subassembly of generally box shape,
   1. with an open front and a transparent top,
   2. said transparent top functions as a means to permit one to view the saw when the guard is in its saw guarding position, 3. said open side is on the side of the saw guard subassembly in the direction from which material to be cut is fed, said open side functions as the open side through which the saw passes when the saw guard subassembly is moved to its saw non-guarding position, b. a slide means being connected to said guard subassembly, said slide means permits the guard subassembly to move between its guarding and non-guarding positions rapidly, wherein said slide means comprises:

1. a lower slide member fixedly positioned on the saw table,
2. an upper slide member engaging the lower slide member and fixedly positioned to the guard subassembly, and
3. said slide members reciprocating relative to each other to guide the movement of the guard subassembly, and c. counterweight means counterbalancing the mass of the guard subassembly so that the guard subassembly may be easy to move from its guarding to its non-guarding position and so that the guard subassembly will automatically move back to its guarding position from its non-guarding position when pressure is removed from the guard subassembly.

2. The saw guard assembly of claim 1 wherein:

a. said guard subassembly has three sides arranged in a generally box shape with two sides parallel to the saw sides and the remaining side connecting together the ends of the aforesaid two sides, b. said open side being at the opposite ends of the aforesaid two sides, c. said transparent side resting on the top edges of the aforesaid three sides and above the saw of the table saw.

3. The saw guard subassembly of claim 2 wherein:

a. said counterweight means is fastened to said upper slide member, and b. said mass of the counterweight is slightly greater than the mass of the movable parts of the guard subassembly and the upper slide member.

* * * * *